(12) United States Patent
Harris

(10) Patent No.: US 10,946,291 B1
(45) Date of Patent: Mar. 16, 2021

(54) GRANTING AND SECURING OWNERSHIP OF CROSS-APPLICATION DIGITAL ASSETS

(71) Applicant: Amazon Technologies, Inc., Seattle, WA (US)

(72) Inventor: Daniel Morgan Harris, Grosse Point Farms, MI (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 15/924,010

(22) Filed: Mar. 16, 2018

(51) Int. Cl.
*A63F 13/85* (2014.01)

(52) U.S. Cl.
CPC .................................... *A63F 13/85* (2014.09)

(58) Field of Classification Search
CPC ........................................................ A63F 13/85
See application file for complete search history.

(56) References Cited

U.S. PATENT DOCUMENTS

| | | | | |
|---|---|---|---|---|
| 6,009,458 A * | 12/1999 | Hawkins | ............ | A63F 3/00075 709/203 |
| 9,892,141 B2 * | 2/2018 | Darcy | ................... | A63F 13/25 |
| 10,348,487 B2 * | 7/2019 | Bisti | ..................... | H04L 9/3236 |
| 2010/0035692 A1 * | 2/2010 | Reville | ................... | A63F 13/12 463/42 |
| 2015/0310497 A1 * | 10/2015 | Valin | ................... | G06Q 30/0269 705/14.66 |
| 2015/0371295 A1 * | 12/2015 | Gill | ....................... | H04L 67/42 463/25 |
| 2019/0028265 A1 * | 1/2019 | Bisti | ..................... | G06F 21/606 |
| 2019/0118094 A1 * | 4/2019 | McCoy | ................ | H04L 9/3247 |
| 2019/0260576 A1 * | 8/2019 | Bisti | ..................... | A63F 13/71 |
| 2019/0282906 A1 * | 9/2019 | Yong | ...................... | A63F 13/69 |

* cited by examiner

*Primary Examiner* — Chase E Leichliter
(74) *Attorney, Agent, or Firm* — Thomas | Horstemeyer, LLP

(57) ABSTRACT

Disclosed are various embodiments for granting and securing ownership of cross-application digital assets using a blockchain. An asset record is generated in a blockchain. The asset record represents a digital asset being awarded to a user by a first application based on an amount of application-measured effort expended by the user or an achievement earned by the user in engaging with the first application. The digital asset may be usable by the user in the first application and at least one second application.

20 Claims, 10 Drawing Sheets

GRANTING AND SECURING OWNERSHIP OF CROSS-APPLICATION DIGITAL ASSETS

BACKGROUND

Since the rise of the modern massively multiplayer online game (MMO), a growing number of game players have been drawn to investment-heavy video games. Such games incorporate traditional role-playing game (RPG) elements, such as character levels or randomized loot as a reward for continued playing time.

Because of its effectiveness in encouraging continued play, the advance of free-to-play games, which typically offer an in-game digital asset store, has only contributed to the prevalence of these systems. In fact, more and more games, such as the wildly successful CALL OF DUTY franchise, are incorporating investment elements in order to reward players for continued effort even when such elements are purely cosmetic or tangential to the core gameplay.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
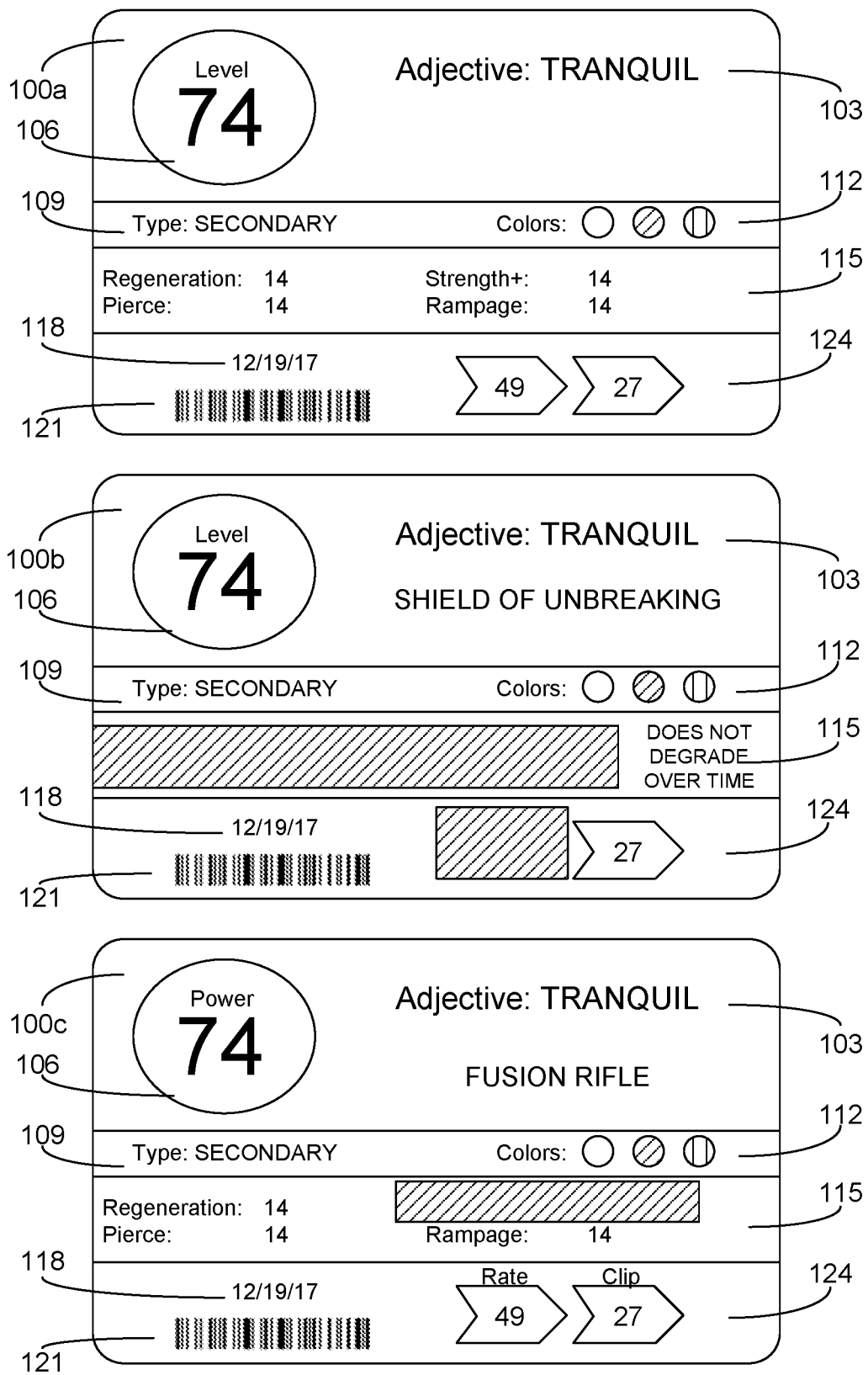
FIG. 1 is a drawing of visual representations of example digital assets according to an embodiment of the present disclosure.

The present disclosure relates to a blockchain-based approach for granting and securing cross-application digital assets. Current games offering investment elements face an inherent problem in that players are unable to truly own the loot they have earned through play. This loot is typically bound to the game itself. In limited situations, the loot may be transferred between games having common ownership. Developers of these games contend with an implicit player-facing friction, which is that that the players themselves know that all earned digital assets are only temporary. This limits the perceived value of the rewards, and thus limits the incentive for players to invest playtime in a given game.

Various embodiments of the present disclosure introduce a blockchain-based approach in order to allow digital assets, such as gaming loot, to be transferred between multiple applications which may be offered by multiple developer entities. A blockchain is an open-ended linked list of records that is secured through the use of cryptography. Each record may include a cryptographic hash of the previous record in the list, along with a timestamp and transaction data. Blockchains may be employed as distributed ledgers, with a peer-to-peer architecture that may be used to validate new records. Previous records may not be altered retroactively without also altering all subsequent records. Also, decentralization makes it difficult to impossible to alter all copies of the records. Blockchains have been implemented as part of cryptocurrencies, such as Bitcoin and ETHEREUM.

As will be described, gaming loot and other digital assets may be issued by application publishers as asset records in a blockchain. Users may transfer these asset records to be used in different applications. For example, a shield awarded to a user by a first game may be moved by the user to a second game in which the asset becomes a rifle. Further, the assets may be transferred from one user to another. As with cryptocurrency, the blockchain is responsible for maintaining a trusted history of transactions. However, instead of awarding currency based on proof of computation, the blockchain awards assets to users based on requests from trusted application publishers. Application publishers integrate with this blockchain in order to award assets to their users, manage their asset inventory, and respond to asset changes.

As one skilled in the art will appreciate in light of this disclosure, certain embodiments may be capable of achieving certain advantages, including some or all of the following: (1) maintaining portability of the digital assets among multiple applications, thereby reducing computer memory requirements to maintain multiple copies of digital assets in memory for multiple applications; (2) eliminating the need for each application publisher to maintain separate computing systems to facilitate digital asset management, thereby reducing redundant hardware and software platforms; (3) allowing users to electronically exchange their digital assets with other users, thereby improving flexibility; (4) improving security by the use of a cryptographically secure, distributed system; (5) maintaining ownership of digital assets by users over a long period of time even if the application publisher ceases operations; and so on.

Turning now to FIG. 1, shown are drawings of visual representations of example digital assets, loot cards 100a, 100b, and 100c, according to an embodiment of the present disclosure. Specifically, loot card 100a corresponds to an asset awarded initially by a first game application, and loot cards 100b and 100c correspond to the same loot card 100a being in use by second and third game applications, respectively.

The loot card 100a has the adjective 103 or name of "tranquil" and a level 106 of "74." The loot card 100a has the type 109 of "secondary" and three colors 112. The loot card 100a has four modifiers 115: "regeneration" with a value of "14," "pierce" with a value of "14," "strength+" with a value of 14, and "rampage" with a value of "14." The date 118 corresponds to when the loot card 100a was initially awarded, and the version 121 in this example is visually represented by a barcode. The loot card 100a has offense and defense values 124 of "49" and "27," respectively.

By contrast, in the loot card 100b, the adjective 103 is now supplemented with the game-specific title of "shield of unbreaking." The modifiers 115 are ignored by the second game application, and the loot card 100b "does not degrade over time." For the offense and defense values 124, the second application ignores the offense value but uses the defense value.

In the loot card 100b, the adjective 103 is supplemented by the game-specific title of "fusion rifle." The level 106 value is interpreted as being a "power" value by the third game application. Three of the four modifiers 115 are in use (regeneration, pierce, and rampage), but the fourth is not (strength+). Both offense and defense values 124 are in use, but they are characterized or labeled in the game as being "rate" and "clip," respectively.

The examples shown in FIG. 1 illustrate that a base loot card 100a can be interpreted in different ways by different applications, as with loot cards 100b and 100c. In the following discussion, a general description of the system and its components is provided, followed by a discussion of the operation of the same.

Figure 2:
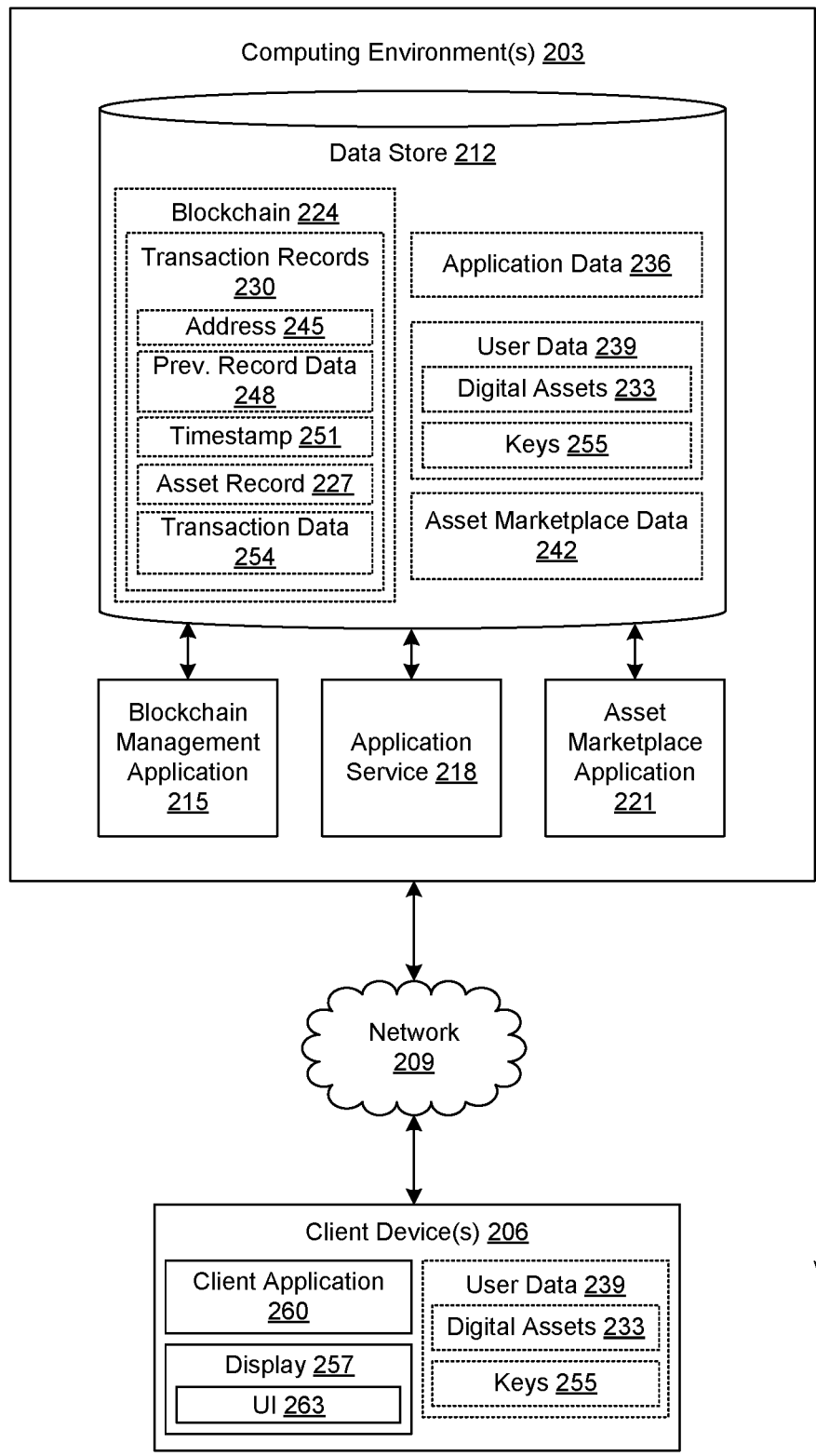
FIG. 2 is a schematic block diagram of a networked environment according to various embodiments of the present disclosure.

With reference to FIG. 2, shown is a networked environment 200 according to various embodiments. The networked environment 200 includes one or more computing environments 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. As contemplated herein, multiple computing environments 203 may be operated by multiple independent parties that have agreed to integrate into the same blockchain.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a blockchain management application 215, an application service 218, an asset marketplace application 221, and other applications, services, processes, systems, engines, or functionality not discussed in detail herein. The blockchain management application 215 is executed to facilitate management of a copy of a blockchain 224 on behalf of the party that operates the computing environment 203. Specifically, the blockchain management application 215 may perform functions such as generating new asset records 227 and adding them to the blockchain 224, updating the blockchain 224 with new transaction records 230, verifying transaction records 230, propagating updates to other blockchain management applications 215 that integrate with the blockchain 224, receiving updates to the blockchain 224 from other blockchain management applications 215, and other functions.

An instance of the blockchain management application 215 may be considered one node in a distributed network with a plurality of nodes. In one embodiment, the blockchain management application 215 may require an application service 218 to be trusted by a majority of nodes based on a distributed majority vote.

It is noted that the blockchain 224 may be implemented as a public or private blockchain 224. As a private blockchain 224, only hosts controlled by application publishers or other trusted entities are allowed to have copies of the blockchain 224. As a public blockchain 224, public hosts are allowed to have copies of the blockchain 224 and to participate with functions of the blockchain management application 215. In some cases, it may be possible for entities to integrate with the blockchain 224 for purposes of leveraging a user's assets even outside a trusted network of applications. Such entities may not be able to award assets but could give new semantic meaning to existing assets.

The application service 218 comprises one or more services that perform server-side functions for a networked application. These functions may include hosting the world state for a multiplayer networked game, maintaining content, generating network pages such as web pages or other forms of network content, management of player inventory, assets, and loot, and so on. It is noted that a computing environment 203 operated by an entity may include multiple application services 218 for different applications. The application may be a game, such as a role-playing game (RPG), a shooter game, a strategy game, a sports game, or other type of games. The application may be a non-game, such as a product review application.

The application awards digital assets 233, or loot, to users. The award of the digital assets 233 may be based at least in part on an amount of application-measured effort spent by the user or an achievement earned by the user in interacting with the application. For example, a game may award a weapon object to a user based on the user spending twenty hours playing the game. A product review application may award a reviewer badge to a user who has reviewed ten products and whose reviews have been voted 75% helpful. Thus, the digital assets 233 may be awarded based upon time expended, reputation, and/or other methods of assessing effort or performance by the user in engaging with the application. Flexibility may be afforded to applications in awarding the digital assets 233 because the participating applications may be required to be trusted to participate in awarding the digital assets 233. In awarding the digital assets 233, the application service 218 integrates with the blockchain management application 215 so that a representation of the digital assets 233, namely the asset records 227, are persisted in the blockchain 224. Subsequently, the digital assets 233 may be traded, donated, or sold to other users, or the user may transfer the digital assets 233 for use in other applications. The digital assets 233 may be transferred between applications even if the applications are not tied by any business relationship. The digital assets 233 may be used in the application(s) in an application-specific manner and may, for example, generate dividends when held over a period of time.

The asset marketplace application 221 facilitates management of an asset marketplace where digital assets 233 may be exchanged, donated, or traded to other users, or where digital assets 223 may be transferred from one application to another. To this end, the asset marketplace application 221 may manage private keys and/or other private data in a virtual wallet for the user in order to make a transaction via the blockchain 224. In some cases, the digital assets 223 of a user may be usable by the user in multiple applications, potentially simultaneously, the applications reinterpreting or rescoping the digital assets 233 to apply specifically to the applications as necessary. In such cases, no transaction via the blockchain 224 would be required. In other cases, the asset marketplace application 221 may facilitate a transfer of digital assets 233 between applications or groups of applications via the blockchain 224.

The asset marketplace application 221 may also facilitate purchase of original digital assets 233 where such digital assets 233 may be purchased. The asset marketplace application 221 may monetize its services by way of a commission or transaction fee assessed on transactions that are performed. The asset marketplace application 221 may generate user interfaces, such as in network pages or applications, which allow for viewing of digital assets 233 of a user and/or listing digital assets 233 for sale or trade in the marketplace. The asset marketplace application 221 may integrate into the blockchain 224 or with the blockchain management application 215 to effect transactions. The asset marketplace may be provided by the asset marketplace application 221 in conjunction with an application marketplace, such as an "app store," where applications can be downloaded or purchased.

In some embodiments, the asset marketplace application 221 may also correspond to a federated identity provider using a technology such as OAuth, such that a single sign-on among different applications may be effected through a log-on using credentials of the asset marketplace application. This afford applications a secure approach of associating application users with their digital assets 233 outside the bounds of the applications.

The data stored in the data store 212 includes, for example, a copy of a blockchain 224, application data 236, user data 239, asset marketplace data 242, and potentially other data. The blockchain 224 corresponds to a local blockchain copy for the particular computing environment 203, where it is understood that multiple copies of the blockchain 224 are maintained by different entities for security and consistency. The blockchain 224 is made up of transaction records 230. The transaction records 230 include an address 245, previous record data 248, a timestamp 251, an asset record 227, transaction data 254, and/or other data.

The address 245 may correspond to a public key that identifies the particular transaction record 230. In one embodiment, the address 245 corresponds to a public key of an originating user (e.g., a selling user). The previous record data 248 includes data that references a previous transaction record 230, which may include a cryptographic hash of the previous transaction record 230, the address 245 of the previous transaction record, and/or other data indicating that the present transaction record 230 is generated based at least in part on a private key corresponding to the public key or address 245 of the previous transaction record 230. The timestamp 251 corresponds to a time at which the transaction record 230 was created or is to go into effect. The asset record 227 describes characteristics of a digital asset 233 that has been awarded to a user. The transaction data 254 may include other data with respect to the transaction record 230, such as an identification of an application and/or user to which the asset record 227 is transferred.

The application data 236 includes data relating to an application hosted by the application service 218. The data may include, for example, game world state information, product reviews, and/or other data that is pertinent to the operation of the application by the application service 218.

The user data 239 corresponds to data associated with users, players, or participants. Such data may include data relating to digital assets 233 owned by the user, including addresses 245, private keys 255, and/or other information that can facilitate location of a corresponding asset record 227 in the blockchain 224 or conducting a transaction. The user data 239 may be managed by the asset marketplace application 221 or an application service 218 as a virtual wallet for the user, such that the digital assets 233 can be transferred to other users or applications.

The asset marketplace data 242 includes data regarding the asset marketplace operated by the asset marketplace application 221. This data may include listings of digital assets 233 that are offered for sale or exchange through the asset marketplace, transaction commission information, information about how the digital assets 223 may be used in various applications, and so forth.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 260 and/or other applications. The client application 260 may be executed in a client device 206, for example, to access network content served up by the computing environment 203 through the application service 218 and/or other servers, thereby rendering a user interface 263 on the display 257. To this end, the client application 260 may comprise, for example, a browser, a dedicated application, etc., and the user interface 263 may comprise a network page, an application screen, etc. Alternatively, the client application 260 may be a special-purpose client, such as for a multi-player networked game. The client device 206 may be configured to execute applications beyond the client application 260 such as, for example, email applications, social networking applications, word processors, spreadsheets, and/or other applications. Also, the user data 239 or portions thereof may be stored in the client device 206 rather than the computing environment 203 in some embodiments.

Figure 3:
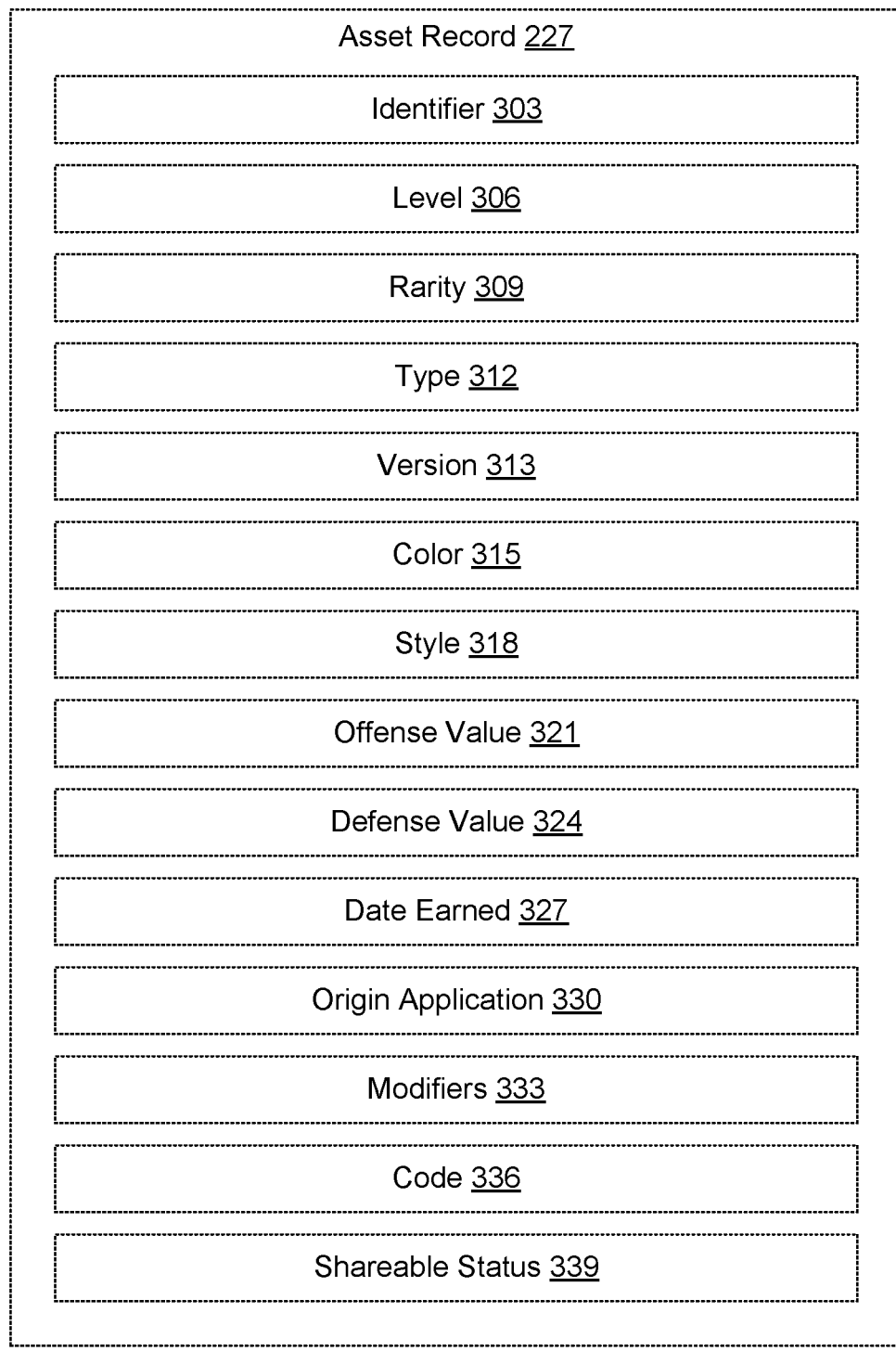
FIG. 3 is a schematic block diagram for an example schema of an asset record according to an embodiment of the present disclosure

Moving on to FIG. 3, shown is an example schema of an asset record 227 according to an embodiment of the present disclosure. The example asset record 227 has a variety of parameters or attributes and would be intended to be used across multiple applications. For example, an asset record 227 may include an identifier 303, a level 306, a rarity 309, a type 312, a version 313, a color 315, a style 318, an offense value 321, a defense value 324, a date earned 328, an origin application 330, modifiers 333, code 336, shareable status 339, and/or other data.

The identifier 303 corresponds to an adjective, a title, or other keywords that are used to identify the corresponding digital asset 233 (FIG. 2) across multiple applications. The level 306 may identify a power or other value corresponding to the overall usefulness of the digital asset 233 in the applications. The rarity 309 may be a value that indicates anticipated frequency of award of the digital asset 233. The value of the rarity 309 may be enforced by the blockchain management application 215 on the basis of actual frequency of award. The type 312 may indicate a category or type associated with the digital asset 233. For example, the type 312 may be main, secondary, utility, and others. The version 313 may correspond to a version number of the digital asset 233. In one implementation, the modulus operator may be applied to a version number to put the digital asset 233 into one of a number of bins. The resulting number may then be salted in order to provide subtypes.

The color 315 may indicate one or more colors associated with a visual aesthetic of the digital asset 233 when rendered on a display 257 (FIG. 2). The style 318 may indicate one or more styles associated with a visual aesthetic of the digital asset 233 when rendered on a display 257. The offense value 321 and the defense value 324 correspond to values indicating usefulness of the digital asset 233 for offense or defense, respectively, when the application is a game.

The date earned 327 corresponds to a date or timestamp at which the digital asset 233 was awarded or created. Origin application 330 corresponds to an identifier of the application that initially awarded the digital asset 233. The modifiers 333 correspond to a parameter or attribute name and value pairs that can speak to the flavor of the digital asset 233 in terms that users can understand. For example, modifiers 333 may include life steal, regeneration, pierce, strength, rampage, and so forth, which may or may not have specific meaning in a given application. The modifiers 333 may be given application-specific semantics that differ from an ordinary meaning of the modifier name. The code 336 may correspond to computer-executable code that performs a function and is stored in the asset record 227.

The shareable status 339 indicates whether the digital asset 233 is shareable among multiple applications and/or multiple application publisher platforms. For example, some digital assets 233 may be useable only in one application at a time, while other digital assets 233 may be useable simultaneously in multiple applications. In some cases, digital assets 233 may be shareable among multiple applications from the same application publisher but not among applications of another application publisher.

Figure 4:
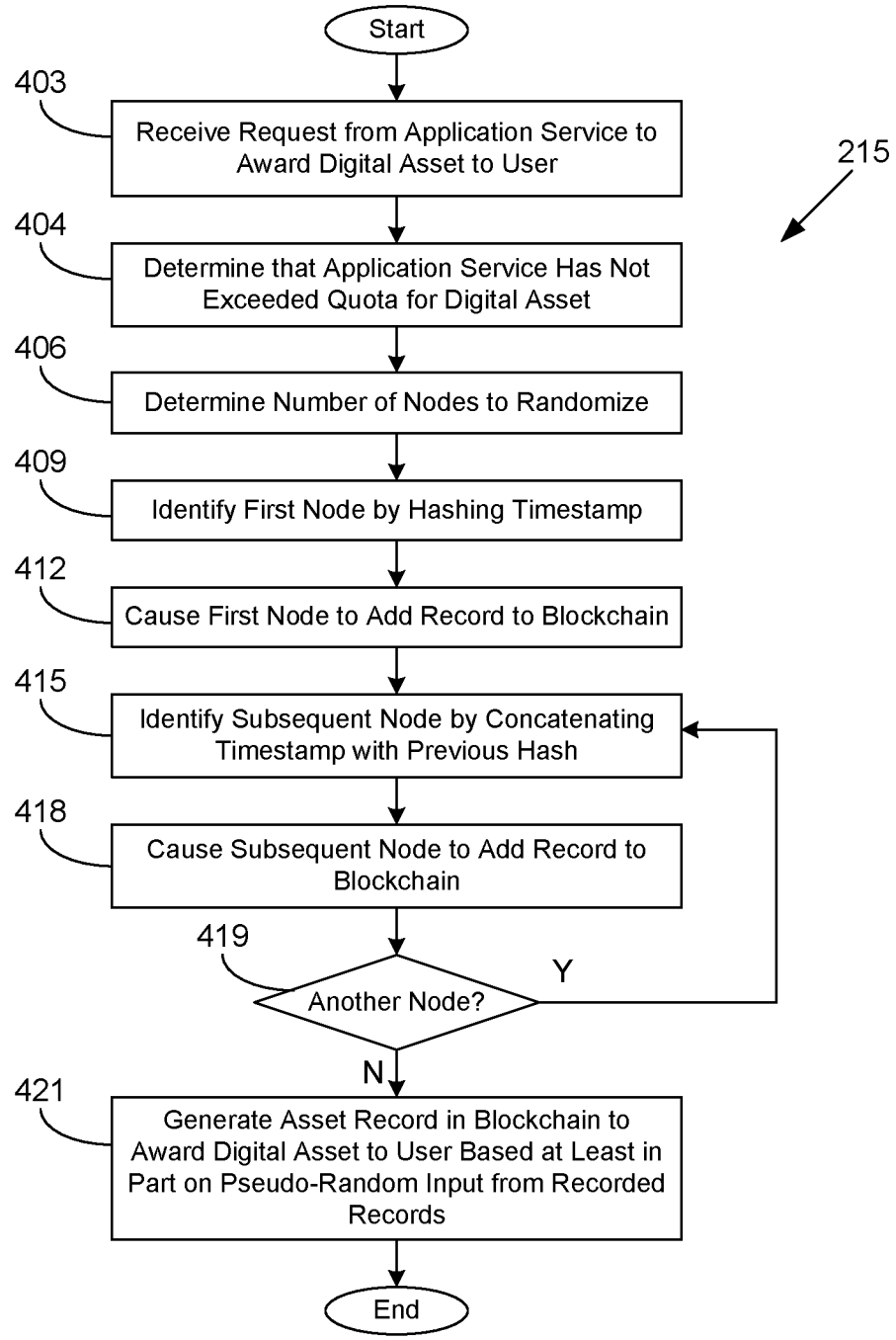
FIGS. 4-6 are flowcharts illustrating examples of functionality implemented as portions of a blockchain management application executed in a computing environment in the networked environment of FIG. 2 according to various embodiments of the present disclosure.

Referring next to FIG. 4, shown is a flowchart that provides one example of the operation of a portion of the blockchain management application 215 according to various embodiments. It is understood that the flowchart of FIG. 4 provides merely an example of the many different types of functional arrangements that may be employed to implement the operation of the portion of the blockchain management application 215 as described herein. As an alternative, the flowchart of FIG. 4 may be viewed as depicting an example of elements of a method implemented in the computing environment 203 (FIG. 2) according to one or more embodiments.

Beginning with box 403, the blockchain management application 215 receives a request from an application service 218 (FIG. 2) to award a digital asset 233 (FIG. 2) to a user. The request may include various parameters and their values from the application service 218 in order to populate an asset record 227 (FIG. 2) using a schema common to multiple application services 218. In box 404, the blockchain management application 215 determines that the application service has not exceeded a quota for awarding the particular digital asset 233 that has been specified. Alternatively, the blockchain management application 215 may determine that a frequency of award of the digital asset corresponds with a stated value in the asset record 227, so that the blockchain management application 215 may enforce a stated rarity or frequency value within the asset record 227. This can involve integration with an asset marketplace application 221 (FIG. 2) to learn values based at least in part on observed economic behavior in the asset marketplace with respect to specific digital assets 233. Thus, a value over time awarded by an application can be enforced to be aligned with a standard, where the value is determined with a combination of asset marketplace observation or static values associated with rarity.

In box 406, the blockchain management application 215 determines a number of nodes that manage the blockchain 224 (FIG. 2) that should be used to randomize the award of the digital asset 233. Randomization is used in order to keep the upcoming award of the digital asset 233 secret from any individual party. Thus, the specific types of asset records 227 being awarded will not be able to be determined by observers of the blockchain 224 until they are actually awarded in the blockchain 224. It is noted that individual nodes that are used will each have their own private key so that an individual node will not be able to spoof the award. In box 409, the blockchain management application 215 identifies a first network node by hashing a timestamp (e.g., an every 10-second timestamp) with a one-way hash. The resulting value can be bucketed to a number of nodes on the network 209 (FIG. 2) that maintain the blockchain 224. In box 412, the blockchain management application 215 causes the first node to add a record to the blockchain 224 with a pseudo-random input.

In box 415, the blockchain management application 215 identifies a subsequent node by concatenating an updated timestamp with the previous hash. In box 418, the blockchain management application 215 causes the subsequent node to add a record to the blockchain 224 with a pseudo-random input. In box 419, the blockchain management application 215 determines whether another network node should be used. If so, the blockchain management application 215 returns to box 415 and identifies another node using an updated timestamp. If not, the blockchain management application 215 proceeds to box 421.

In box 421, the blockchain management application 215 generates an asset record 227 in the blockchain 224 to award the digital asset 233 to the user based at least in part on pseudo-random input from the recorded records from boxes 412 and 418. A public/private key pair may be generated, and the private key associated with the user for future transactions relating to the digital asset 233. Thereafter, the operation of the portion of the blockchain management application 215 ends.

Figure 5:
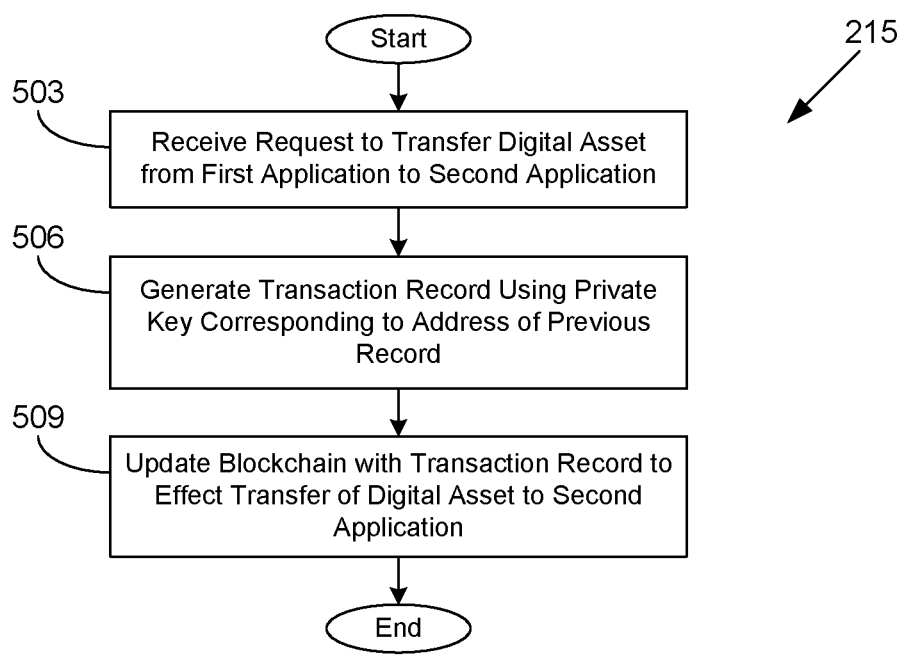

Turning now to FIG. 5, shown is a flowchart that provides one example of the operation of a portion of the blockchain management application 215 according to various embodiments. It is understood that the flowchart of FIG. 5 provides merely an example of the many different types of functional arrangements that may be employed to implement the operation of the portion of the blockchain management application 215 as described herein. As an alternative, the flowchart of FIG. 5 may be viewed as depicting an example of elements of a method implemented in the computing environment 203 (FIG. 2) according to one or more embodiments.

Beginning with box 503, the blockchain management application 215 receives a request to transfer a digital asset 233 (FIG. 2) from a first application to a second application. The request may identify the digital asset 233 based at least in part on an address 245 (FIG. 2) of the most recent transaction record 230 (FIG. 2) respecting the digital asset 233 in the blockchain 224 (FIG. 2). The request may include a unique identifier of the application service 218 for the second application to which the digital asset 233 is to be transferred. The blockchain management application 215 may be provided with the private key corresponding to the address 245.

In box 506, the blockchain management application 215 generates a new transaction record 230 using the private key corresponding to the address of the previous transaction record 230. Specifically, the blockchain management application 215 may generate the previous record data 248 (FIG. 2) using the private key, which verifies that the new transaction record 230 is legitimate. The blockchain management application 215 may generate a new timestamp 251 (FIG. 2) for the new transaction record 230.

In box 509, the blockchain management application 215 updates the blockchain 224 to effect a transfer of the digital asset 233 from the first application to the second application. The updated blockchain 224 may then be replicated to various hosts or nodes that implement the blockchain 224. The blockchain management application 215 may notify the application service 218 corresponding to the first application or the application service 218 corresponding to the second application that the digital asset 233 has been transferred. Subsequently, the digital asset 233 becomes usable in the second application and may become unusable in the first application.

Thereafter, the operation of the portion of the blockchain management application 215 ends. It is noted that in some embodiments no transaction in the blockchain 224 is required to transfer digital assets 233 between applications. For example, the digital asset 233 may be simultaneously usable in multiple applications. In some cases, the digital asset 233 may be simultaneously used in the applications of a single publisher, or may otherwise be managed by the publisher. Thus, a blockchain 224 transaction may be used to transfer the digital asset 233 between different application publishers or sets of applications. Transferring the digital asset 233 may depend on a shareable status 339 associated with the asset record 227, or an application could request a lock from the blockchain 224 in order for the digital asset 233 to be used in the application. The lock would enforce usage of the digital asset 233 only by one application at a time.

Figure 6:
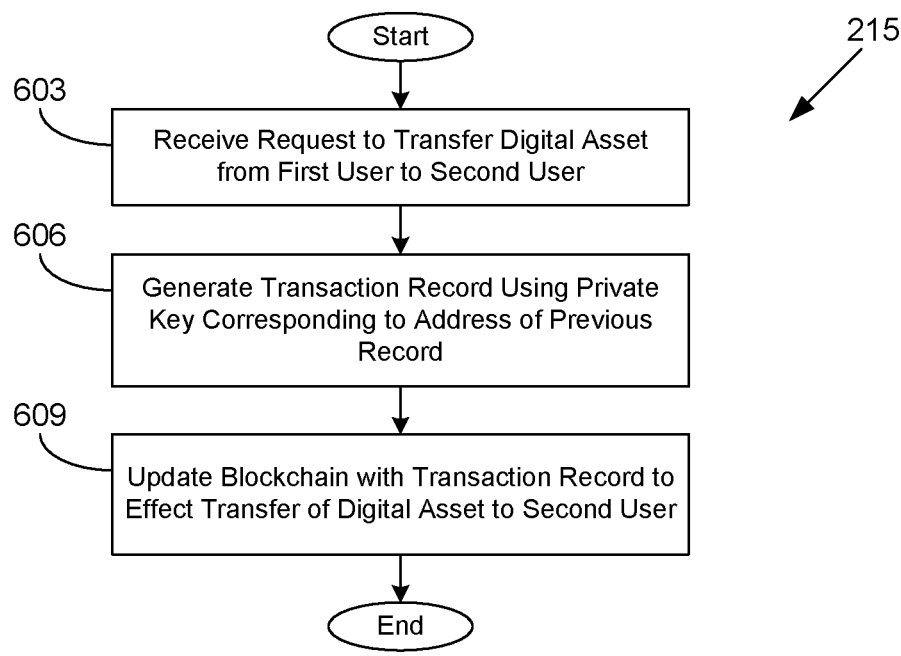

Continuing to FIG. 6, shown is a flowchart that provides one example of the operation of a portion of the blockchain management application 215 according to various embodiments. It is understood that the flowchart of FIG. 6 provides merely an example of the many different types of functional arrangements that may be employed to implement the operation of the portion of the blockchain management application 215 as described herein. As an alternative, the flowchart of FIG. 6 may be viewed as depicting an example of elements of a method implemented in the computing environment 203 (FIG. 2) according to one or more embodiments.

Beginning with box 603, the blockchain management application 215 receives a request to transfer a digital asset 233 (FIG. 2) from a first user to a second user. The request may identify the digital asset 233 based at least in part on an address 245 (FIG. 2) of the most recent transaction record 230 (FIG. 2) respecting the digital asset 233 in the blockchain 224 (FIG. 2). The request may include a unique identifier of the second user to whom ownership is to be transferred. The blockchain management application 215 may be provided with the private key corresponding to the address 245. In one scenario, the private keys are exchanged from the first user to the second user, and every transaction record 230 is intrinsically bound to a key.

In box 606, the blockchain management application 215 generates a new transaction record 230 using the private key corresponding to the address of the previous transaction record 230. Specifically, the blockchain management application 215 may generate the previous record data 248 (FIG. 2) using the private key, which verifies that the new transaction record 230 is legitimate. The blockchain management application 215 may generate a new timestamp 251 (FIG. 2) for the new transaction record 230.

In box 609, the blockchain management application 215 updates the blockchain 224 to effect a transfer of the digital asset 233 from the first user to the second user. The updated blockchain 224 may then be replicated to various hosts or nodes that implement the blockchain 224. Subsequently, the digital asset 233 becomes usable by the second user and unusable by the first user. Thereafter, the operation of the portion of the blockchain management application 215 ends.

Figure 7A:
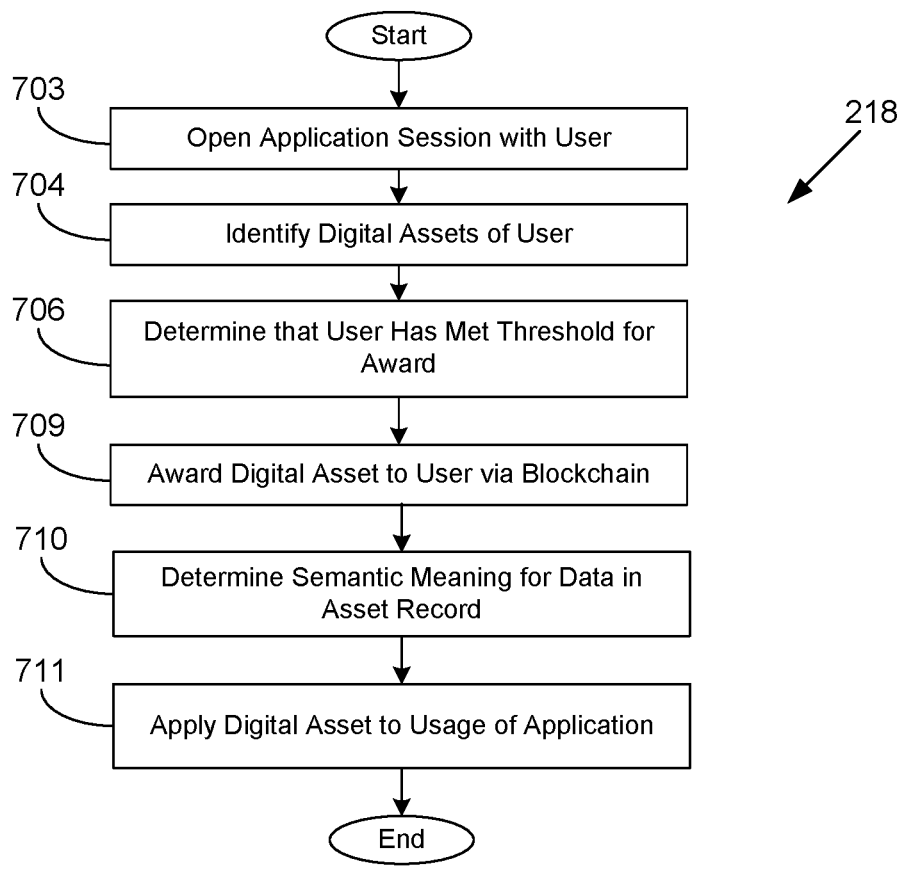
FIGS. 7A and 7B are flowcharts illustrating examples of functionality implemented as portions of an application service executed in a computing environment in the networked environment of FIG. 2 according to various embodiments of the present disclosure.

Referring next to FIG. 7A, shown is a flowchart that provides one example of the operation of a portion of the application service 218 according to various embodiments. It is understood that the flowchart of FIG. 7A provides merely an example of the many different types of functional arrangements that may be employed to implement the operation of the portion of the application service 218 as described herein. As an alternative, the flowchart of FIG. 7A may be viewed as depicting an example of elements of a method implemented in the computing environment 203 (FIG. 2) according to one or more embodiments.

Beginning with box 703, the application service 218 opens an application session with the user. For example, the user may launch the client application 260 (FIG. 2) and commence interacting with the client application 260 such that a request to begin a session is transmitted to the application service 218 via the network 209 (FIG. 2). In box 704, the application service 218 identifies the digital assets 233 that are owned by the user. For instance, the application service 218 may communicate with the asset marketplace application 221 or a client application 260 to determine the digital assets 233 that are in the user's virtual wallet in the user data 239. The user may provide the application service 218 with an assertion of a user identity recognized by the asset marketplace application 221 in order to identify and authorize access to the virtual wallet. In box 706, the application service 218 determines that the user has met a threshold for awarding a digital asset 233 (FIG. 2). For example, the user may have engaged with the application for a certain amount of time, performed a particular task with proficiency, or met other criteria.

In box 709, the application service 218 awards the digital asset 233 to the user via the blockchain 224 (FIG. 2) by sending a request to the blockchain management application

215 (FIG. 2). In some cases, the application service 218 may notify the asset marketplace application 221 and update a user's virtual wallet with an identification of the digital asset 233. The application service 218 may provide controlling information regarding the digital asset 233 to the user, such as private keys, or otherwise make the capability of using this information available to the user. In box 710, the application service 218 determines semantic meanings for data in the asset record 227. For example, the application service 218 may ignore certain parameters from the asset record 227 or may assign different semantic meanings to the data as compared to other application services 218 and other applications.

In box 711, the application service 218 applies the digital asset 233 to the usage of the application. For example, if the digital asset 233 corresponds to gaming loot, the application service 218 that is a game may allow usage of the gaming loot to perform some function within the game. In some cases, the digital asset 233 may be consumable, through which the application service 218 disallows or weakens its usage beyond a threshold amount. Alternatively, the application service 218 may require that the digital asset 233 be redeemed or transferred back to the application service 218. Thereafter, the operation of the portion of the application service 218 ends.

Figure 7B:
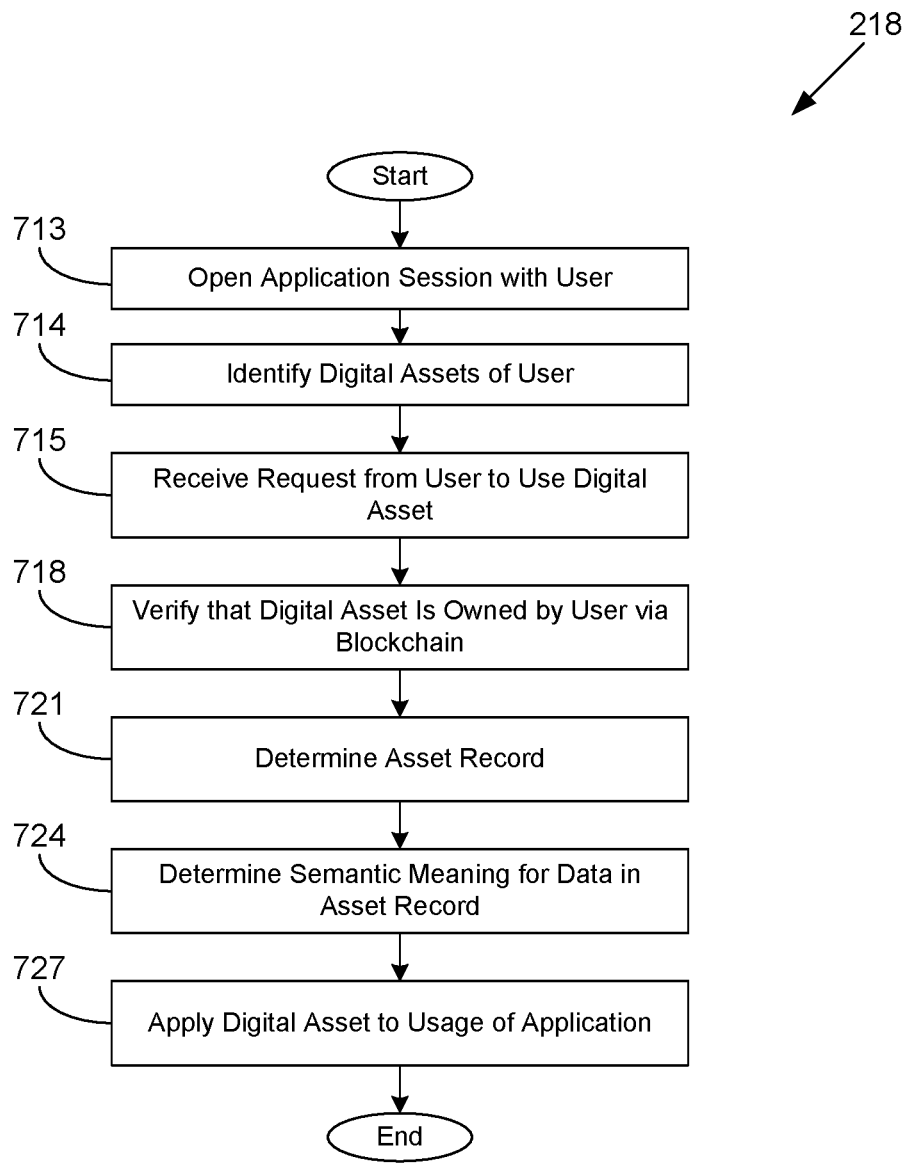

Moving on to FIG. 7B, shown is a flowchart that provides one example of the operation of another portion of the application service 218 according to various embodiments. It is understood that the flowchart of FIG. 7B provides merely an example of the many different types of functional arrangements that may be employed to implement the operation of the portion of the application service 218 as described herein. As an alternative, the flowchart of FIG. 7B may be viewed as depicting an example of elements of a method implemented in the computing environment 203 (FIG. 2) according to one or more embodiments.

Beginning with box 713, the application service 218 opens an application session with the user. For example, the user may launch the client application 260 (FIG. 2) and commence interacting with the client application 260 such that a request to begin a session is transmitted to the application service 218 via the network 209 (FIG. 2). In box 714, the application service 218 identifies the digital assets 233 that are owned by the user. For instance, the application service 218 may communicate with the asset marketplace application 221 or a client application 260 to determine the digital assets 233 that are in the user's virtual wallet in the user data 239. The user may provide the application service 218 with an assertion of a user identity (e.g., using OAuth) recognized by the asset marketplace application 221 in order to identify and authorize access to the virtual wallet.

In box 715, the application service 218 receives a request from a user to use a digital asset 233. In box 718, the application service 218 verifies that the digital asset 233 is owned by the user via the blockchain 224. In some cases, the application service 218 may verify that the digital asset 233 has been transferred to the application in use and/or is not in use simultaneously in another application. In box 721, the application service 218 determines the asset record 227 (FIG. 2) corresponding to the digital asset 233 from the blockchain 224. In box 724, the application service 218 determines semantic meanings for data in the asset record 227. For example, the application service 218 may ignore certain parameters from the asset record 227 or may assign different semantic meanings to the data as compared to other application services 218 and other applications.

In box 727, the application service 218 applies the digital asset 233 to the usage of the application. For example, if the digital asset 233 corresponds to gaming loot, the application service 218 that is a game may allow usage of the gaming loot to perform some function within the game. In some cases, the digital asset 233 may be consumable, through which the application service 218 disallows or weakens its usage beyond a threshold amount. Alternatively, the application service 218 may require that the digital asset 233 be redeemed or transferred back to the application service 218. Thereafter, the operation of the portion of the application service 218 ends.

Figure 8:
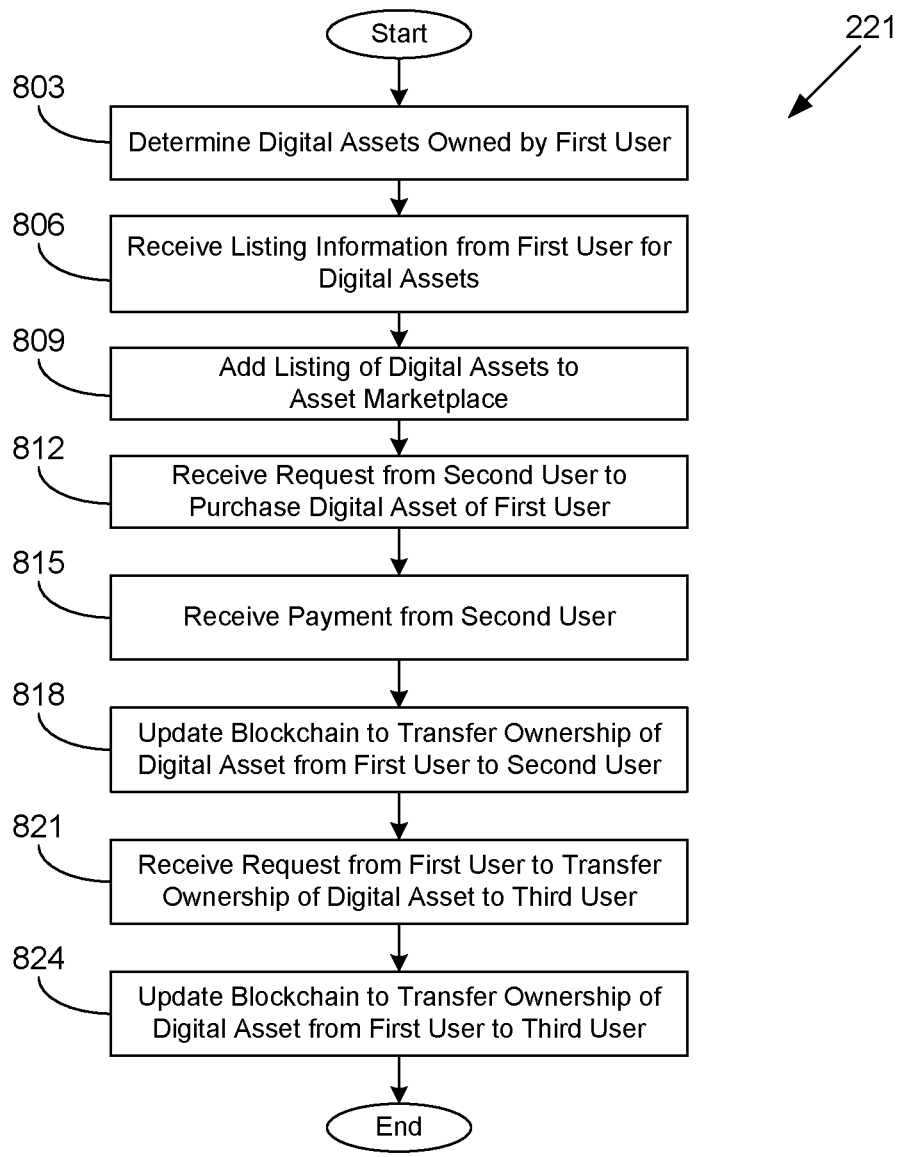
FIG. 8 is a flowchart illustrating one example of functionality implemented as portions of an asset marketplace application executed in a computing environment in the networked environment of FIG. 2 according to various embodiments of the present disclosure.

Turning next to FIG. 8, shown is a flowchart that provides one example of the operation of a portion of the asset marketplace application 221 according to various embodiments. It is understood that the flowchart of FIG. 8 provides merely an example of the many different types of functional arrangements that may be employed to implement the operation of the portion of the asset marketplace application 221 as described herein. As an alternative, the flowchart of FIG. 8 may be viewed as depicting an example of elements of a method implemented in the computing environment 203 (FIG. 2) according to one or more embodiments.

Beginning with box 803, the asset marketplace application 221 determines digital assets 233 (FIG. 2) owned by a first user. For example, the asset marketplace application 221 may query a blockchain 224 (FIG. 2) for transaction records 230 indicating that the first user owns a digital asset 233. In box 806, the asset marketplace application 221 receives listing information from the first user at a client device 206 (FIG. 2) for one or more digital assets 233. The first user may indicate a price or a description of another digital asset 233 that is sought in exchange for a listed digital asset 233.

In box 809, the asset marketplace application 221 adds the listing of digital assets 233 to the asset marketplace in the asset marketplace data 242, where the specific digital assets 233 may be searched by a client device 206 via an index or accessed via a category listing. The asset marketplace application 221 may subsequently generate a series of user interfaces 263 (FIG. 2) with information about the listed digital assets.

In box 812, the asset marketplace application 221 receives a request from a second user at a client device 206 to purchase a digital asset 233 from the first user. In box 815, the asset marketplace application 221 receives payment from the second user, which may be in the form of a digital currency transaction, a credit card transaction, a stored value card transaction, or other financial transaction. Alternatively, the asset marketplace application 221 may receive ownership of an exchanged digital asset 233 from the second user.

In box 818, the asset marketplace application 221 causes the blockchain 224 to be updated to transfer ownership of the digital asset 233 from the first user to a second user. Where another digital asset 233 is being exchanged, the ownership of the other digital asset 233 may be transferred to the first user.

In box 821, the asset marketplace application 221 receives a request from a first user at a client device 206 to transfer ownership of a digital asset 233 to a third user. The request may identify the particular digital asset 233 involved and may identify the third user. This request may be for a donation of the digital asset 233 or to provide temporary ownership of the digital asset 233 for the third user. In box 824, the asset marketplace application 221 causes the blockchain 224 to be updated to transfer ownership of the digital asset 233 from the first user to the third user. In some embodiments, the transfer of the digital asset 233 from the first user to the third user may require an acceptance by the third user before the blockchain 224 is updated to effect the transfer. Acceptance by the third user may be required, for example, to avoid spamming users with low-value assets. Thereafter, the operation of the portion of the asset marketplace application 221 ends.

Figure 9:
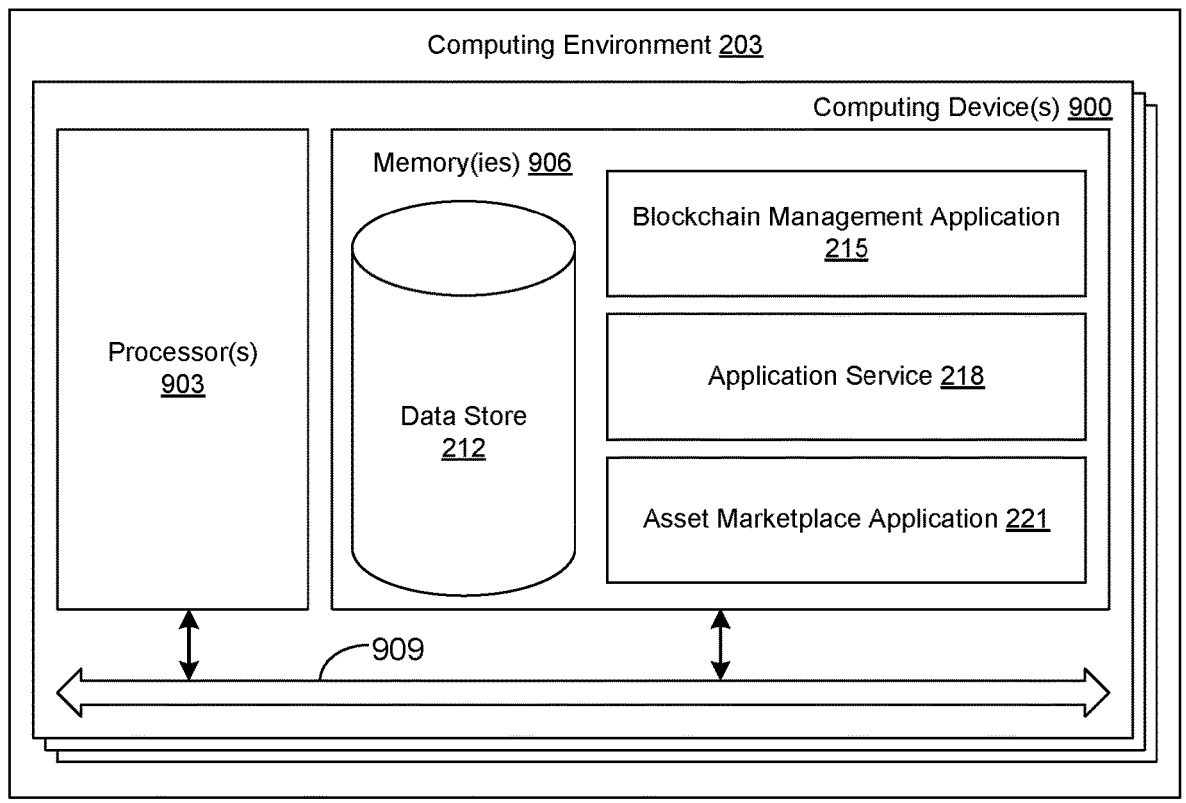
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 900. Each computing device 900 includes at least one processor circuit, for example, having a processor 903 and a memory 906, both of which are coupled to a local interface 909. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the blockchain management application 215, the application service 218, the asset marketplace application 221, and potentially other applications. Also stored in the memory 906 may be a data store 212 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the blockchain management application 215, the application service 218, the asset marketplace application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-8 show the functionality and operation of an implementation of portions of the blockchain management application 215, the application service 218, and the asset marketplace application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 4-8 show a specific order of execution, it is understood that the order of execution may differ from that which is depicted. For example, the order of execution of two or more blocks may be scrambled relative to the order shown. Also, two or more blocks shown in succession in FIGS. 4-8 may be executed concurrently or with partial concurrence. Further, in some embodiments, one or more of the blocks shown in FIGS. 4-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the blockchain management application 215, the application service 218, and the asset marketplace application 221, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the blockchain management application 215, the application service 218, and the asset marketplace application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices 900 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable in at least one computing device, wherein when executed the instructions cause the at least one computing device to at least:
generate an asset record in a blockchain, the asset record representing gaming loot being awarded to a first user by a first game application based at least in part on an amount of application-measured effort expended by the first user or an achievement earned by the first user in engaging with the first game application, the gaming loot being usable by the first user in the first game application;
update the blockchain to transfer the gaming loot to a second game application, the gaming loot thereby being usable by the first user in the second game application and unusable by the first user in the first game application, the second game application ignoring at least one first attribute of the gaming loot and assigning a different semantic meaning to at least one second attribute of the gaming loot; and
update the blockchain to transfer ownership of the gaming loot to a second user, the gaming loot thereby being usable by the second user in the second game application and unusable by the first user in the second game application.

2. The non-transitory computer-readable medium of claim 1, wherein when executed the instructions further cause the at least one computing device to at least generate a set of records in the blockchain, individual ones of the set of records corresponding to a pseudo-random input computed by a respective node of a plurality of nodes.

3. The non-transitory computer-readable medium of claim 2, wherein individual ones of the plurality of nodes are trusted participants in the blockchain.

4. The non-transitory computer-readable medium of claim 1, wherein the first and second game applications are provided by different game publishers that have integrated with the blockchain.

5. A system, comprising:
at least one computing device; and
a blockchain management application executable in the at least one computing device, wherein when executed the blockchain management application causes the at least one computing device to at least:
generate an asset record in a blockchain, the asset record representing gaming loot being awarded to a first user by a first game application based at least in part on an amount of application-measured effort expended by the first user or an achievement earned by the first user in engaging with the first game application, the gaming loot being usable by the first user in the first game application;
update the blockchain to transfer the gaming loot to at least one second game application, the gaming loot thereby being usable by the first user in the at least one second game application and unusable by the first user in the first game application, the at least one second game application ignoring at least one first attribute of the gaming loot and assigning a different semantic meaning to at least one second attribute of the gaming loot; and
update the blockchain to transfer ownership of the gaming loot from the first user to a second user, the gaming loot thereby being usable by the second user in the at least one second game application and unusable by the first user in the at least one second game application.

6. The system of claim 5, wherein when executed the blockchain management application further causes the at least one computing device to at least determine that the first game application is trusted based at least in part on a distributed majority vote of participants in the blockchain.

7. The system of claim 5, wherein when executed the blockchain management application further causes the at least one computing device to at least:
determine that a stated value in the gaming loot is aligned with an actual value determined in an asset marketplace.

8. The system of claim 5, wherein the gaming loot includes at least one parameter corresponding to computer-executable code.

9. The system of claim 5, wherein the first game application and the at least one second game application are different game applications.

10. The system of claim 5, wherein the at least one second game application assigns a value to the gaming loot in use through the at least one second game application based at least in part on a rarity of the gaming loot.

11. The system of claim 5, wherein the gaming loot is one of a plurality of different types of digital assets awarded by the first game application, individual ones of the plurality of different types of digital assets being expressed via a common asset record schema.

12. The system of claim 5, wherein when executed the blockchain management application further causes the at least one computing device to at least:
receive a request to transfer ownership of the gaming loot from the first user to the second user; and
generate a transaction record using a private key corresponding to an address of a previous transaction record in response to receiving the request to transfer ownership of the gaming loot from the first user to the second user.

13. The system of claim 5, wherein when executed the blockchain management application further causes the at least one computing device to at least:
receive a request to transfer the gaming loot from the first game application to the at least one second game application; and
generate a transaction record corresponding to an address of a previous transaction record in response to receiving the request to transfer the gaming loot from the first game application to the at least one second game application.

14. The system of claim 5, wherein when executed the blockchain management application further causes the at least one computing device to at least:
determine that a quota for awarding the gaming loot has not been exceeded.

15. The system of claim 5, wherein the asset record comprises an indication of whether the gaming loot is shareable among a plurality of applications.

16. A method, comprising:
generating, via at least one of one or more computing devices, an asset record in a blockchain, the asset record representing gaming loot being awarded to a first user by a first game application based at least in part on an amount of application-measured effort expended by the first user or an achievement earned by the first user in engaging with the first game application, the gaming loot being usable by the first user in the first game application;
updating, via at least one of the one or more computing devices, the blockchain to transfer the gaming loot to at least one second game application, the gaming loot thereby being usable by the first user in the at least one second game application and unusable by the first user in the first game application, the at least one second game application ignoring at least one first attribute of the gaming loot and assigning a different semantic meaning to at least one second attribute of the gaming loot; and
updating, via at least one of the one or more computing devices, the blockchain to transfer ownership of the gaming loot to a second user, the gaming loot thereby being usable by the second user in the at least one second game application and unusable by the first user in the at least one second game application.

17. The method of claim 16, further comprising:
generating, via at least one of the one or more computing devices, a network page that includes a list of a plurality of digital assets owned by the first user and buyable by the second user;
receiving, via at least one of the one or more computing devices, a selection of the gaming loot from the plurality of digital assets by the second user; and
wherein the blockchain is updated to transfer ownership of the gaming loot to the second user in response to the selection and receiving a payment from the second user.

18. The method of claim 16, further comprising:
generating, via at least one of the one or more computing devices, a network page that includes a list of a plurality of digital assets owned by the first user;
receiving, via at least one of the one or more computing devices, a selection of the gaming loot by the first user from the plurality of digital assets;
receiving, via at least one of the one or more computing devices, an identification of the second user from the first user; and
wherein the blockchain is updated to transfer ownership of the gaming loot to the second user in response to the selection and receiving the identification of the second user.

19. The method of claim 16, further comprising updating, via at least one of the one or more computing devices, the blockchain to expire use of the gaming loot.

20. The method of claim 16, wherein the gaming loot includes at least one parameter corresponding to a visual aesthetic.

* * * * *